US008243297B2

(12) United States Patent
Kato

(10) Patent No.: US 8,243,297 B2
(45) Date of Patent: Aug. 14, 2012

(54) INFORMATION PROCESSING APPARATUS CAPABLE OF ADDING ADDITIONAL FUNCTIONS TO PRINT PROCESSING RELATED PROGRAM, PRINT CONTROL METHOD AND PROGRAM

(75) Inventor: Hisashi Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1278 days.

(21) Appl. No.: 11/001,758

(22) Filed: Dec. 1, 2004

(65) Prior Publication Data

US 2005/0117180 A1    Jun. 2, 2005

(30) Foreign Application Priority Data

Dec. 2, 2003 (JP) ................................. 2003-403558
Nov. 19, 2004 (JP) ................................. 2004-336381

(51) Int. Cl.
*G06K 15/00* (2006.01)
*G06F 15/00* (2006.01)
*G06F 3/00* (2006.01)
(52) U.S. Cl. ............ 358/1.14; 358/1.9; 358/1.13; 710/1
(58) Field of Classification Search ................. None
See application file for complete search history.

(56) References Cited

U.S. PATENT DOCUMENTS

| 5,500,715 | A | 3/1996 | Ta et al. |
| 6,563,519 | B1 | 5/2003 | Minagawa |
| 2002/0065807 | A1* | 5/2002 | Kawamoto et al. ............... 707/1 |
| 2002/0161936 | A1* | 10/2002 | Minagawa ......................... 710/1 |
| 2003/0103221 | A1* | 6/2003 | Natori ........................... 358/1.9 |
| 2004/0049741 | A1* | 3/2004 | Natori ........................... 715/527 |
| 2004/0070604 | A1* | 4/2004 | Bhat et al. ....................... 345/741 |

FOREIGN PATENT DOCUMENTS

| EP | 1357471 | 10/2003 |
| JP | 2001-075758 | 3/2001 |
| JP | 2002-108580 A | 4/2002 |
| JP | 2002-196905 A1 | 7/2002 |
| JP | 2002-202865 A1 | 7/2002 |
| JP | 2002-202868 A1 | 7/2002 |
| JP | 2002-292974 | 10/2002 |

* cited by examiner

*Primary Examiner* — Vincent Rudolph
(74) *Attorney, Agent, or Firm* — Canon USA Inc IP Division

(57) ABSTRACT

An information processing apparatus, etc., are disclosed. The information processing apparatus includes: first rule storage means for storing a first conflict processing rule determined in accordance with a dependency relation held between two or more settings of the function of the print processing related program; second rule storage means for storing a second conflict processing rule determined in accordance with a dependency relation held between settings of the function of the print processing related program and the additional function and; and setting adjustment means for reading the first conflict processing rule and the second conflict processing rule from the first rule storage means and the second rule storage means, and for performing setting adjustment processing such that inconsistencies do not arise between any of two settings of the print processing related program function and the additional function based on the first conflict processing rule and the second conflict processing rule which have been read.

12 Claims, 12 Drawing Sheets

INFORMATION PROCESSING APPARATUS CAPABLE OF ADDING ADDITIONAL FUNCTIONS TO PRINT PROCESSING RELATED PROGRAM, PRINT CONTROL METHOD AND PROGRAM

BACKGROUND OF THE INVENTION

1. Field of the Invention

The present invention relates to an information processing apparatus, a method of print control and a program for expanding the functionalities of print systems.

2. Description of the Related Art

Printer drivers for controlling the output of printers are usually provided by printer manufacturers for installation by the end user. After installation, however, a need may arise to improve or add additional functionality to the printer driver.

This is usually accomplished by plug-ins, which are software modules generally used to modify or add functionality to software components. Thus, printer drivers that achieve the addition of a specific function by using plug-ins are becoming more prevalent.

For example, a technique for achieving the simplification of print processing and the improvement of print speed in an information processing system has been disclosed (for example, refer to Japanese Patent Laid-Open No. 2002-108580).

When additional functionality is added by a plug-in, the user may be allowed to modify the plug-in settings as desired (e.g., using a print setting sheet user interface usually added to existing print setting sheets of the print driver). However, the modified settings may conflict with the original settings or other settings (including settings for printer drivers and settings for additional function modules). Often before an additional function is added, when a UI is provided to the user to change print setting sheets, the settings are arranged in order not to cause inconsistencies among the settings. By inconsistencies, it is meant for example, that one cannot simultaneously have both the "Staple" and the "Collate" printer functions as settings. Thus, only the items allowed for the user to set are selectable while other non-selectable items are grayed out. That is, items for which inconsistencies may arise when set by a user are prohibited. The processing to prevent inconsistencies among the settings is known as conflict processing.

However, since the plug-in to be added is unknown to the printer driver, it is often difficult to determine inconsistencies. Thus, performance of accurate conflict processing remains a difficult task.

SUMMARY OF THE INVENTION

The present invention has been made in order to solve at least one of the problems described above. According to an aspect of the present invention, there is provided an information processing apparatus capable of adding an additional function to a print processing related program. The information processing apparatus includes: first rule storage means for storing a first conflict processing rule determined in accordance with a dependency relation held between two or more settings of the function of the print processing related program; second rule storage means for storing a second conflict processing rule determined in accordance with a dependency relation held between settings of the function of the print processing related program and the additional function and; setting adjustment means for reading the first conflict processing rule and the second conflict processing rule from the first rule storage means and the second rule storage means, and for performing setting adjustment processing such that settings of the print processing related program function and the additional function do not conflict with each other based on the first conflict processing rule and the second conflict processing rule which have been read.

According to another aspect of the present invention, there is provided a method of print control using an information processing system capable of adding an additional function to a print processing related program. The method includes: a first step of obtaining setting information on the settings of the print processing related program function and the additional function; and a second step of reading a first conflict processing rule and a second conflict processing rule from a first rule storage means for storing the first conflict processing rule determined in accordance with a dependency relation held between two or more settings of the function of the print processing related program and a second rule storage means for storing the second conflict processing rule determined in accordance with a dependency relation held between settings of the function of the print processing related program and the additional function, and for performing setting adjustment processing such that settings of the print processing related program function and the additional function do not conflict with each other by referring to the setting information obtained in the first step based on the first conflict processing rule and the second conflict processing rule which have been read.

Other features and advantages of the present invention will be apparent from the following description taken in conjunction with the accompanying drawings, in which like reference characters designate the same or similar parts throughout thereof.

DETAILED DESCRIPTION OF THE EMBODIMENTS

An information processing apparatus, a method of print control and a program thereof according to the present embodiment achieves conflict processing even in an environment in which a new function is added to a print processing related program (printer driver) in a plug-in form.

Figure 1:
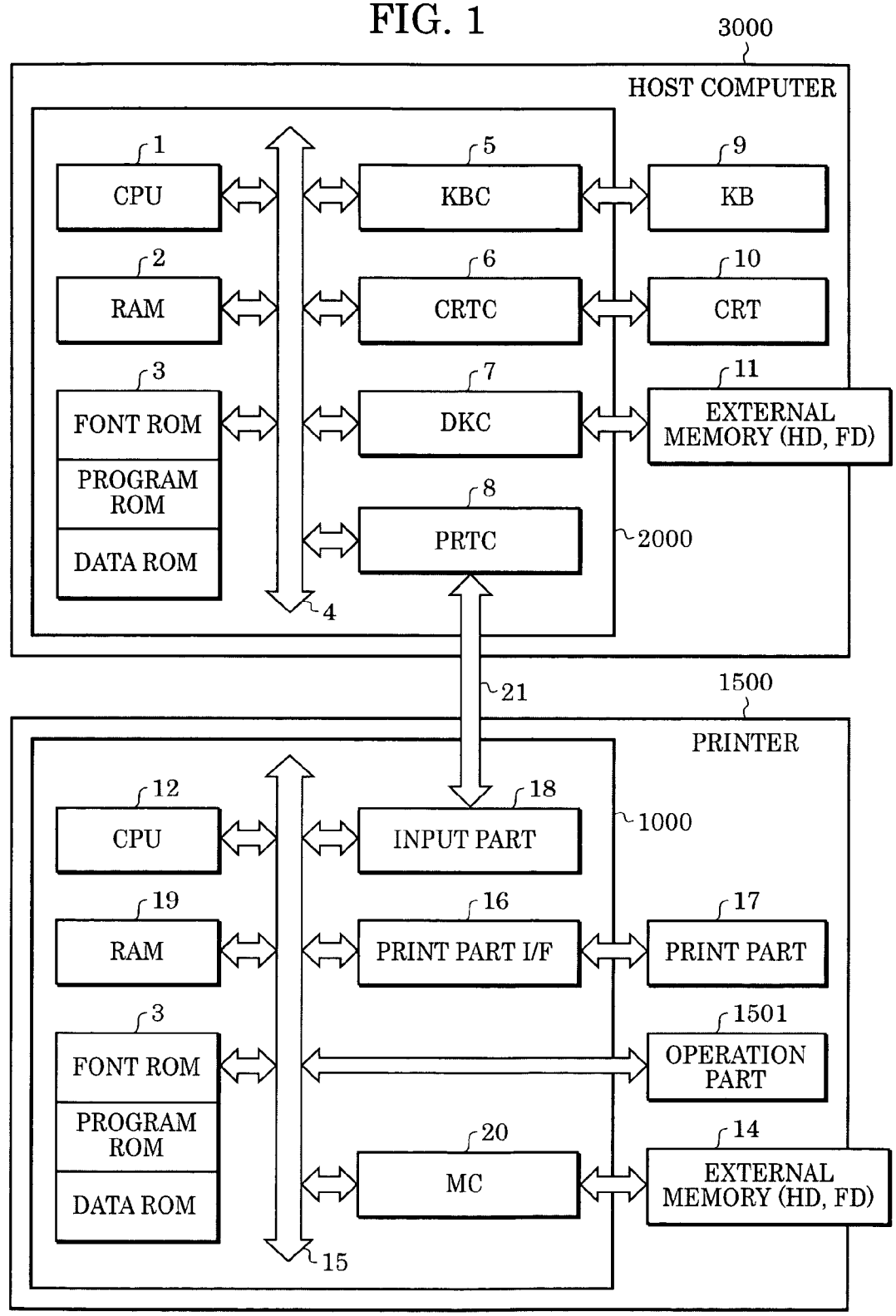
FIG. 1 is a block diagram illustrating a schematic configuration of a print processing system including a host computer (information processing system) according to an embodiment of the present invention.

In the following, a detailed description will be given of embodiments of the present invention with reference to the accompanied drawings. FIG. 1 is a block diagram illustrating a schematic configuration of a print processing system including a host computer (information processing system) according to an embodiment of the present invention. In this regard, although a print processing system is shown as an embodiment, the present invention is not limited to this. The present invention may be applied to a standalone system, a system including a plurality of systems, and to a system in which processing is performed by connecting through a network such as a LAN (local area network), WAN (wide area network), etc., as long as it is an environment in which a printer driver can be executed.

In FIG. 1, reference numeral 3000 denotes a host computer (information processing system), and includes a CPU (central processing unit) 1 which executes processing on documents including a combination of graphics, images, characters, tables (including spreadsheets), etc., based on a document processing program, etc., stored in a program ROM of a ROM (read only memory) 3 or an external memory 11. The CPU 1 integrally controls each of the devices connected to a system bus 4. Also, the program ROM of the ROM 3 or the external memory 11 stores an operating system (OS), which is the control program of the CPU 1, etc., a font ROM of the ROM 3 or the external memory 11 stores font data, etc., to be used for the document processing described above, and a data ROM of the ROM 3 or the external memory 11 stores various data to be used for the above-described document processing, etc. Reference numeral 2 denotes a RAM (random access memory), and functions as a main memory, a work area, etc., of the CPU 1.

Reference numeral 5 is a keyboard controller (KBC), and controls the input from a keyboard 9 and an unillustrated pointing device. Reference numeral 6 is a CRT controller (CRTC), and controls the display of a CRT (cathode ray tube) display 10. Reference numeral 7 is a disk controller (DKC), and controls the access to and from the external memory 11 such as a hard disk (HD), a flexible disk (FD), etc., which store a boot program, various applications, font data, user files, edit files, a printer control command creation program (in the following, referred to as a printer driver), etc.

Reference numeral 8 is a printer controller (PRTC), which is connected to a printer 1500 through a predetermined bi-directional interface (interface) 21, and executes communication control processing with the printer 1500. In this regard, the CPU 1 executes, for example, outline-font expansion (rasterization) processing into a display information RAM, which is set in the RAM 2, and provides WYSIWYG (what you see is what you get) on the CRT 10. Also, the CPU 1 opens various registered windows, and executes various data processing based on the commands instructed by an unillustrated mouse cursor, etc., on the CRT 10. When executing printing, the user opens the windows on the print settings, and the user can perform the settings for the printer 1500 described below, and the settings of the print processing method for the printer driver including a selection of print mode.

In the printer 1500, reference numeral 12 is a printer CPU. The printer CPU 12 outputs an image signal as output information to a print part (printer engine) 17 connected to a system bus 15 based on the control program, etc., stored in a program ROM of a ROM 13 or the control program, etc., stored in an external memory 14. Also, the program ROM of the ROM 13 stores a control program, etc., of the CPU 12. A font ROM of the ROM 13 stores font data, etc., to be used when the above-described output information is created. A data ROM of the ROM 13 stores information, etc., to be used in the host computer 3000 when the printer 1500 does not have an external memory 14 such as a hard disk, etc.

The CPU 12 is capable of performing communication processing with the host computer 3000 through an input part 18, and is capable of providing notification information, etc., of the printer 1500 to the host computer 3000. Reference numeral 19 is a RAM which functions as a main memory, a work area, etc., of the CPU 12, and the memory capacity thereof can be expanded by an optional RAM connected to an unillustrated expansion port. In this regard, the RAM 19 is used for an output information expansion area, environment data storage area, an NVRAM (Non-Volatile RAM), etc.

The external memory 14, which is a hard disk (HD), an IC card, etc., is access controlled by a memory controller (MC) 20. The external memory 14 is connected as an option, and stores font data, an emulation program, form data, etc. Also, reference numeral 1501 is an operation panel, and switches for operation and LED displays, etc., are disposed thereon. Also, the above-described external memory 14 is not limited to a single device. At least one or more of the external memories 14 may be included, and a plurality of optional font cards and external memories storing programs which interpret printer controller languages for different language systems may be connected in addition to the internal fonts. Furthermore, an NVRAM (not shown) may be included, and printer-mode setting information from the operation panel 1501 may be stored there.

Figure 10:
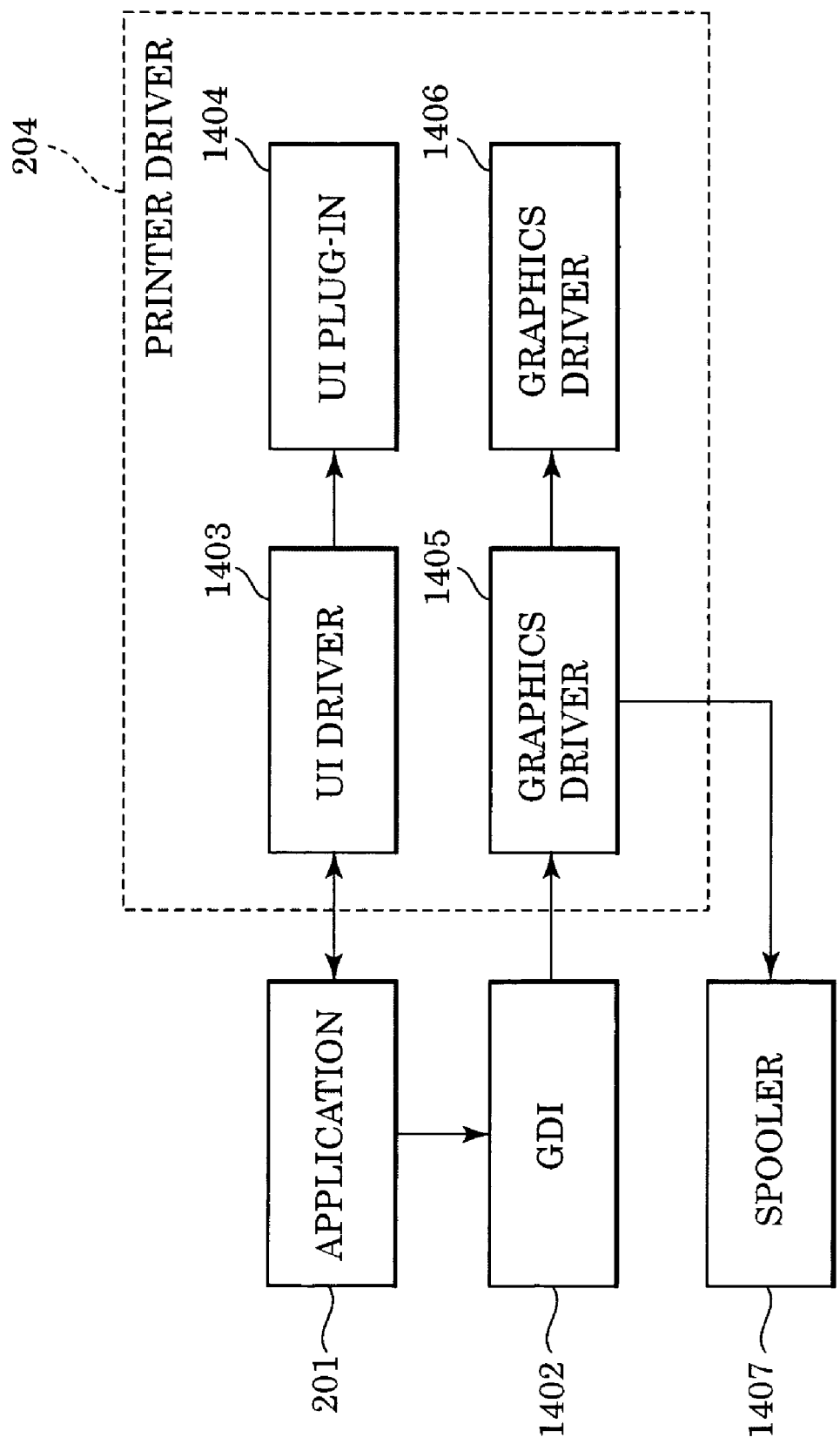
FIG. 10 is a diagram illustrating an example of an expansion system of the printer driver 204.

Next, a description will be provided of a system for expanding the functions of a printer driver 204 in accordance with an embodiment of the present invention. FIG. 10 is a diagram illustrating an expansion system of the printer driver 204. FIG. 10 illustrates a structure of a UI when a plug-in module is added to the printer driver 204. In FIG. 10, the plug-in module includes a UI plug-in 1404 having an additional function of a UI driver 1403, and a graphics driver 1406 having an additional function of a graphics driver 1405. With reference to FIG. 10, a description will be given of each of the plug-in modules.

The UI plug-in 1404 is used when the printer driver 204 adds a new sheet to the print setting sheet (UI) provided to the user, and when various event processing installed in the UI driver 1403 such as the processing performed by the UI driver 1403 at installation time is customized. The UI driver 1403 obtains the interface published by the UI plug-in 1404 when a DDI (device driver interface) exported to the system is called. The customization processing installed in the UI driver 1403 is executed by communicating with the UI plug-in 1404 using the interface of the UI plug-in 1404 obtained by the UI driver 1403.

At the same time, the graphics plug-in 1406 is used when DDI processing, which is an interface between GDI (graphics device interface) 1402 and the graphics driver 1405, is intercepted or processing is added at a specific timing, or the spool processing of the print data is intercepted. The DDI exported by the graphics driver 1405 is appropriately called from the GDI 1402 in order to create a job. At the timing of the initialization thereof, the graphics driver 1405 obtains the interface published by the graphics plug-in 1406, and holds it in the RAM 2. The processing of the graphics plug-in 1406 corresponding to the DDI is called at the timing of the DDI being called using the interface obtained here. The called graphics plug-in 1406 executes the processing installed in the plug-in, and the processing is returned to the graphics driver 1405 again.

Here, when the processing is intercepted by the graphics plug-in 1406, the DDI terminates the processing there, and if additional processing is installed, the subsequent processing continues without change. When the print data spool processing of the graphics driver 1405 is intercepted by the graphics plug-in 1406, the interface of the graphics plug-in 1406 is called immediately before the print data in the graphics driver 1405 is spooled. The called graphics plug-in 1406 obtains the data to be spooled, performs specific processing, and then calls a spool processing function of the graphics driver 1405 again, thereby passing specific processed data to the graphics driver 1405. The graphics driver 1405, which has received the data, executes the processing for actually spooling the data into a system spooler 1407. In this manner, by installing the additional function in the plug-in module, an expansion system of the printer driver 204 is achieved.

Figure 2:
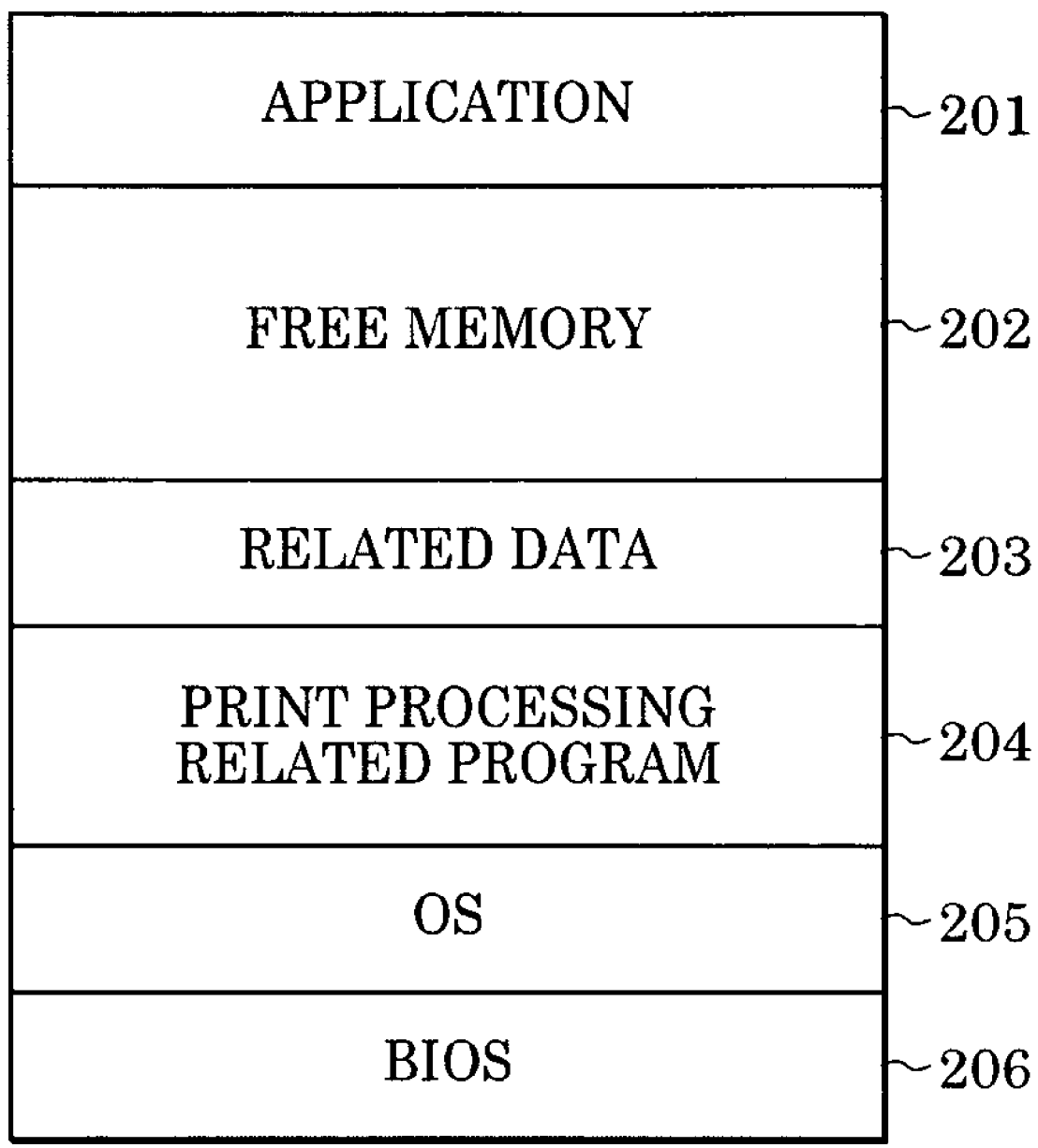
FIG. 2 is a diagram illustrating an example of a memory map in a state in which a print processing related program (printer driver) has been loaded into a RAM 2 of a host computer 3000 and has become executable.

Next, a description will be given of a memory map in a state in which a print processing related program (printer driver) has been loaded into the RAM 2 in the host computer 3000, and has become executable. FIG. 2 is a diagram illustrating an example of the memory map in a state in which a print processing related program (printer driver) has been loaded into the RAM 2 of the host computer 3000, and has become executable. As shown in FIG. 2, a memory map, which includes an application 201, a free memory 202, related data 203, a print processing related program (in the following, referred to as a printer driver) 204, an OS 205, and a BIOS 206, is formed in the RAM 2.

Figure 3:
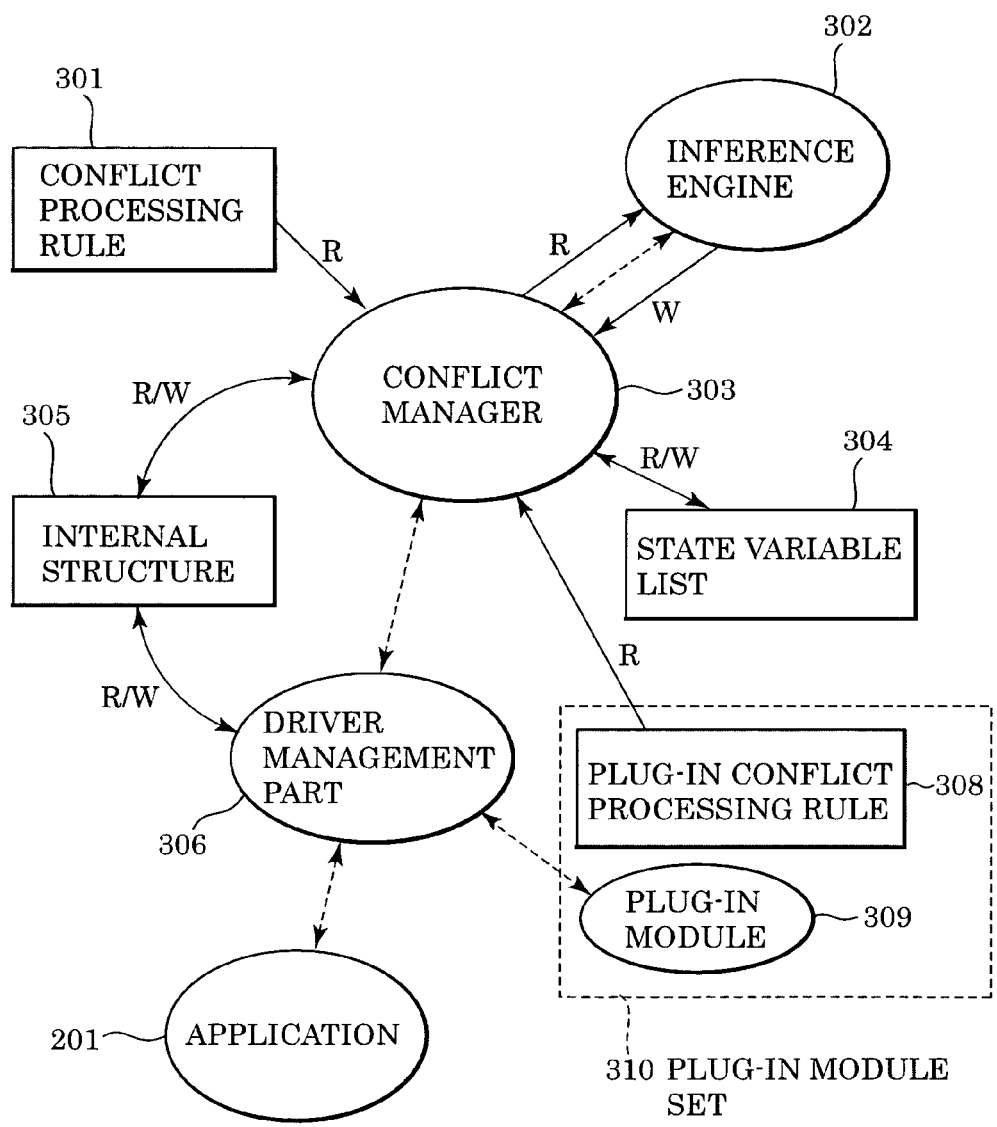
FIG. 3 illustrates relationship between various modules of a print driver when an additional plug-in module set 310 is installed.

Moreover, FIG. 3 is a diagram illustrating the configuration of each of the modules in a state in which an additional functional plug-in module set 310 is installed in a printer driver 204. As shown in FIG. 3, in the plug-in installation set 310, a plug-in module 309 and an individual conflict processing rule 308 of the plug-in module 309 are supplied. Also, before a plug-in is added, the printer driver 204 includes a conflict processing rule 301, an inference engine 302, a conflict manager 303, a state variable list 304, an internal structure 305, and a driver management part 306. Note that in the present exemplary embodiment, the additional functionality to be added to the printer driver 204 is a book-binding print function as further described with reference to FIGS. 8A and 8B. This is accomplished by incorporating the plug-in module 309 with the print driver 204.

Reference numeral 301 is the conflict processing rule, and includes the definitions of rules for preventing inconsistencies between settings of the printer driver 204 before a plug-in is added. In this regard, a specific example of the conflict processing rules will be described with reference to FIG. 7. Reference numeral 303 is a conflict manager, and performs management in order to match both data of the state variable list 304 and the internal structure 305. The state variable list 304 contains state variables such as Group, Staple, and Collate, which define print functions. These functions (also referred to as setting items) can be selected via the printer driver 204 to initiate the functions. The state variable list 304 also has on or off values (settings) indicating whether these printer functions are on or off. Also, the data in the internal structure 305 are members (for example, cGroup, cStaple, and cCollate), which are variables corresponding to the setting items (for example, group, staple, and sort) capable of being set by the printer driver 204 and the values (on=1, off=0).

Reference numeral 302 is the inference engine, which reads the conflict processing rule 301 and the conflict processing rule 308 of the plug-in through the conflict manager 303, performs a conflict check (the checking of whether the settings comply with the rules), and sends back the result thereof to the conflict manager 303. Unlike the related art, the inference engine 302 can accurately perform conflict checking because of the availability of rules (e.g., conflict processing rule 308), which are compatible with the original printer driver and are provided with the plug-in module. Reference numeral 306 is the driver management part, which performs display control of the UI for performing initialization processing and the print settings and operation control in the printer driver 204 in response to a print setting request, etc., from the application 201. Also, the driver management part 306 requests the conflict manager 303 to perform conflict processing so that inconsistencies between each of the settings do not occur. Also, the driver management part 306 also exchanges data between the plug-in module 309.

Figure 4:
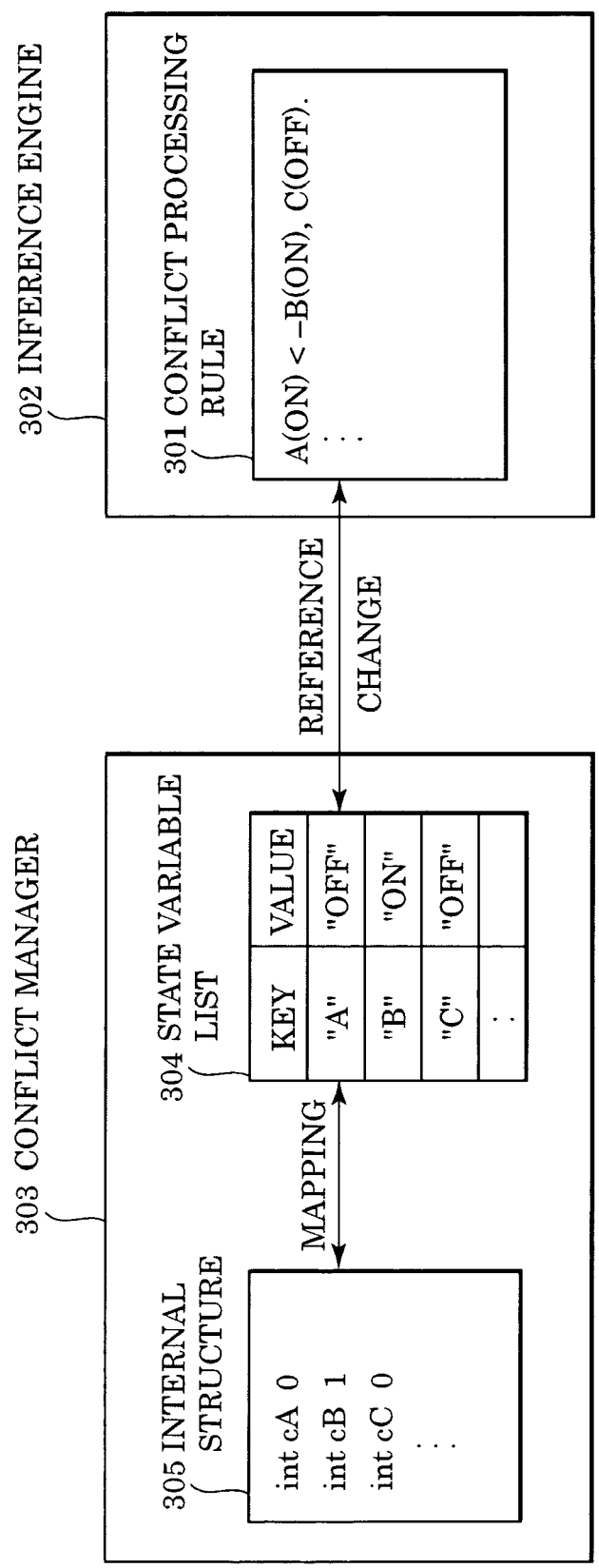
FIG. 4 is a diagram illustrating a specific example of conflict processing in a conflict manager 303 and an inference engine 302.

Here, a description will be given of how the conflict manager 303 and the inference engine 302 shown in FIG. 3 perform the conflict processing using the state variable list 304, the internal structure 305, and the conflict processing rule 301 by a simple specific example. FIG. 4 is a diagram illustrating a specific example of the conflict processing in the conflict manager 303 and the inference engine 302. In this regard, in FIG. 4, the variable list 304 and the internal structure 305 are described in the frame of the conflict manager 303, and the conflict processing rule 301 is described in the inference engine 302 in order to show that the conflict manager 303 uses the variable list 304 and the internal structure 305, and the inference engine 302 uses the conflict processing rule 301.

In a specific example shown in FIG. 4, an example of conflict processing in accordance with the settings of the printer functional names A, B, and C are shown. As shown in FIG. 4, the internal structure 305 stores members int cA, cB, cC, . . . corresponding to the printer functional names A, B, C, . . . and the values thereof 0, 1, 0, . . . . The conflict manager 303 generates a state variable list 304 containing the state variable A=OFF, the state variable B=ON, the state variable C=OFF, . . . by referring to the members and the values thereof in the internal structure 305. The inference engine 302 refers to the state variable list 304, and thus the initial values of the state values of the printer functional names A, B, and C in the inference engine 302 become OFF, ON, and OFF, respectively.

Also, suppose that the conflict processing rule 301 contains the following rule:

A (ON)<–B (ON), C (OFF).

This is a definition of a rule stating that when the function B is ON and the function C is OFF, the function A is turned ON. The inference engine 302 reads the conflict processing rule 301 through the conflict manager 303. Here, suppose that the inference engine 302 has read the conflict processing rule 301. Since the initial values are such that the printer functional name B=ON and the printer functional name C=OFF, the rule stating that A (ON)<–B (ON), C (OFF), defined in the conflict processing rule 301, requires that A be turned ON. Thus the inference engine 302 changes the state variable of the printer functional name A on the left side to ON. That is, the inference engine 302 updates the state variable of the state variable list 304 to become A=ON.

After the inference engine 302 has completed the inference of the conflict check, the conflict manager 303 reflects the changed value of the state variable A onto the corresponding member int cA in the internal structure 305 of the printer driver 204. That is, the value of the int cA is changed from 0 to 1 by satisfying the above-described rule. By the processing as shown above, the conflict manager 303 and the inference engine 302 update the state variable list 304 such that settings do not conflict with each other. By conflict, it is meant that one cannot simultaneously have both the "Staple" function, for example, and the "Collate" function, for example, as printer settings. The driver management part 306 reflects this result onto the setting information (int cA, cB, . . . ) in the internal structure 305 to be used for UI.

In this regard, it should be noted that the rule defined in the conflict processing rule 301 is simple and exemplary. Although not discussed, the rules can either be simpler or more complicated relative to the discussed example. Other examples in conflict processing rule 301 are as follows.
(Conflict Processing Rule 301)

Collate (OFF)<–Group (ON)         (2)

Collate (OFF)<–Staple (ON)         (3)

Collate (ON)<–Group (OFF)         (4)

The conflict processing rule 308 of the plug-in module set 310 similarly contains specific defined rules. As an example, the following rule is defined therein.
(Conflict Processing Rule 308)

Group (OFF)<–Booklet(ON)         (1)

Here, Collate means that documents are sorted or ordered in a proper sequence, Group indicates that documents are collected or aggregated together into units, Staple means that documents are fastened together by a stapling pin, and Booklet indicates a book-binding print function, wherein documents are bound together into a book.

Next, a description will be given of the processing on the UI of the printer driver 204 in the host computer 3000 according to the present embodiment. When the initialization processing included in the printer driver 204 is called by the application 201 running under the control of the OS 205, the printer driver 204 is loaded into the RAM 2 under the control of the OS 205. When the printer driver 204 is loaded into the RAM 2, the initialization processing part of the printer driver 204 included in the driver management part 306 is called, and the initialization processing is performed.

Figure 5:
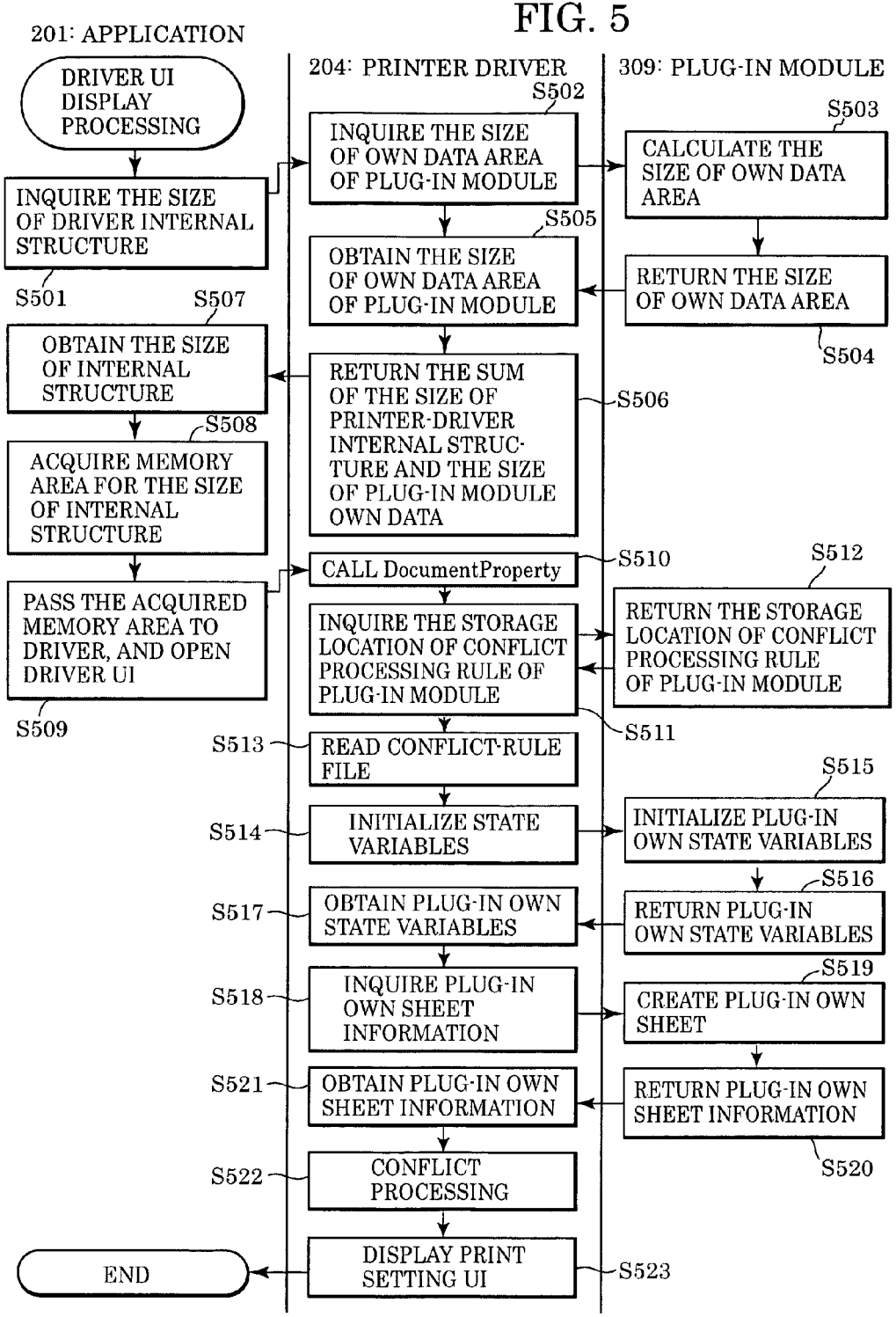
FIG. 5 is a diagram illustrating a flow of initialization processing when the application 201 shown in FIG. 3 opens a UI of the printer driver 204.

FIG. 5 is a diagram illustrating a flow of the initialization processing when the application 201 shown in FIG. 3 opens a UI of the printer driver 204. In this regard, the plug-in module 309 shown in FIG. 5 is incorporated in the printer driver 204 by the plug-in as shown in FIG. 3.

First, the application 201 inquires of the printer driver 204 about the size of the memory area for storing the internal structure of the printer driver 204 (step S501). Thus the printer driver 204 inquires of the plug-in module 309 about the size of the data area of the internal structure necessary for the plug-in module 309 (step S502). The plug-in module 309 calculates (step S503) the size of the area (the size of an individual data area) of the necessary internal structure, and returns the size of the calculated individual data area to the printer driver 204 (step S504). After obtaining the size of the individual data area from the plug-in module 309 (step S505), the printer driver 204 returns to the application 201 the sum of the size of the data area in the internal structure 305 for the printer driver 204 and the size of the individual data of the plug-in module 309 obtained in the above-described step S505 (step S506).

Figure 6:
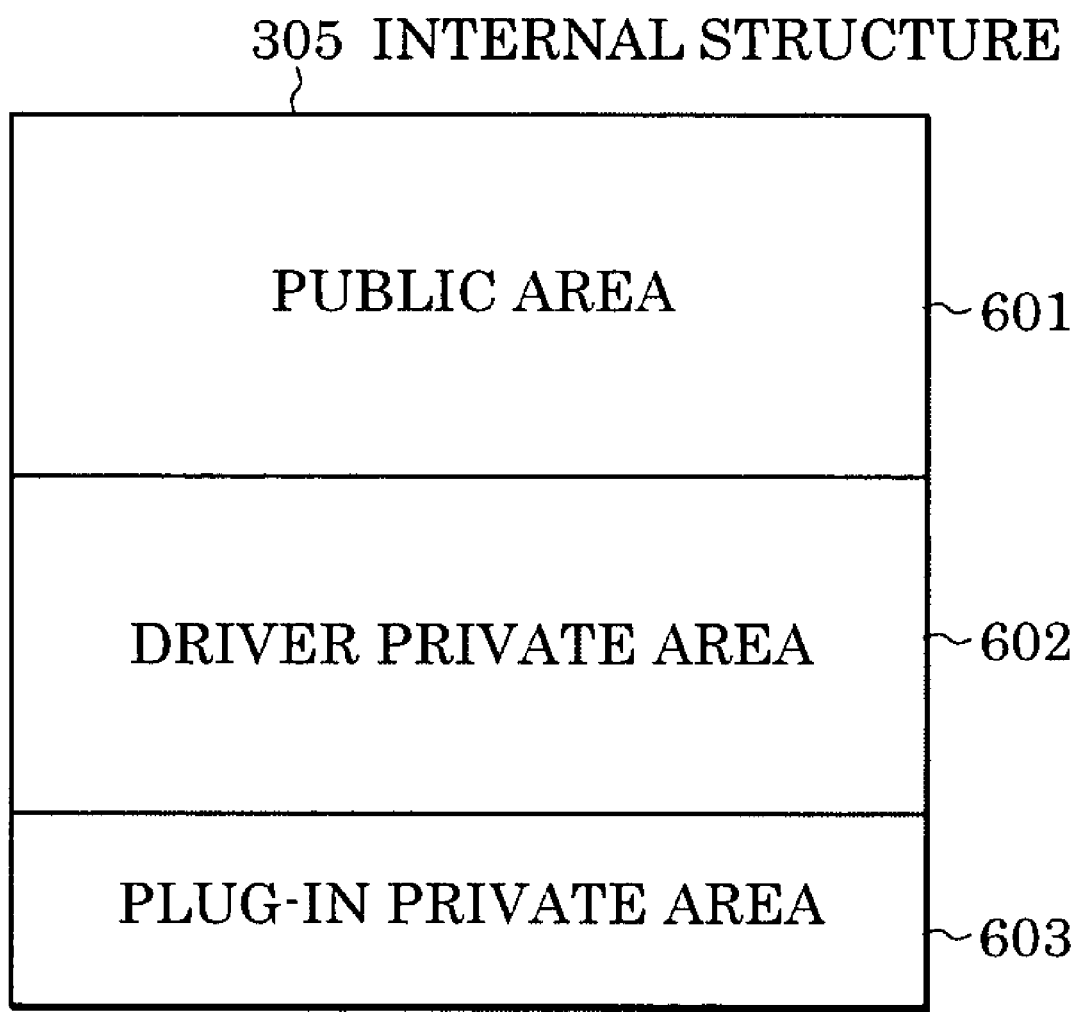
FIG. 6 is a diagram illustrating an example of a memory map of an internal structure 305 that can be used by the printer driver 204.

The application 201 receives the value returned from the printer driver 204 (step S507), and acquires a memory area for the obtained size in the free memory 202 (step S508). The application 201 passes the memory area acquired in the above-described step S508, and instructs the printer driver 204 to open the UI of the printer driver 204 (step S509). The internal structure 305 at this time has, for example, a memory map as shown in FIG. 6. FIG. 6 is a diagram illustrating the example of a memory map of the internal structure 305 used by the printer driver 204. As shown in FIG. 6, the internal structure 305 includes a public area 601, a driver private area 602 corresponding to the size of the data area for the printer driver 204, and a plug-in private area 603 corresponding to the size of the individual data area of the plug-in module 309. Next, the interface of the printer driver 204 is called based on the instruction in step S509 (step S510).

The printer driver 204 inquires of the plug-in module 309 about the storage location of the conflict processing rule 308 supplied with the plug-in module 309 (step S511). Thus the plug-in module 309 returns to the printer driver 204 the storage location of the file in which the conflict processing rule 308 related to the setting values of the plug-in module 309 are described (step S512).

The inference engine 302 reads the conflict processing rule 308 supplied with the plug-in module 309 into the RAM 2 through the conflict manager 303, and then reads the conflict processing rule 301 (step S513).

As described in FIG. 4, for all the printer functional names defined in the conflict processing rules 301 and 308, the state variables and the values thereof corresponding to individual printer functional names are held as the state variable list 304. As shown in FIG. 4, the values of the state variables in the state variable list 304 are linked with the corresponding members in the internal structure 305 used in the printer driver 204. The initial values of all the state variables in the state variable list 304 are set to the values of the members of the internal structure 305.

In step S514, the initialization processing of the state variables is performed through the conflict manager 303. In the initialization processing, the state variable list 304 of the printer driver 204 is generated by referring to the internal structure 305, and then an instruction of the initialization of the state variables originally held by the plug-in module 309 is given to the plug-in module 309 (step S515). Thus the plug-in module 309 returns the initialized state variables (in this embodiment) to the printer driver 204 (step S516). The printer driver 204 receives the state variables of the plug-in module 309, and adds the variables to the state variable list 304 through the conflict manager 303 (step S517).

Figure 8A:
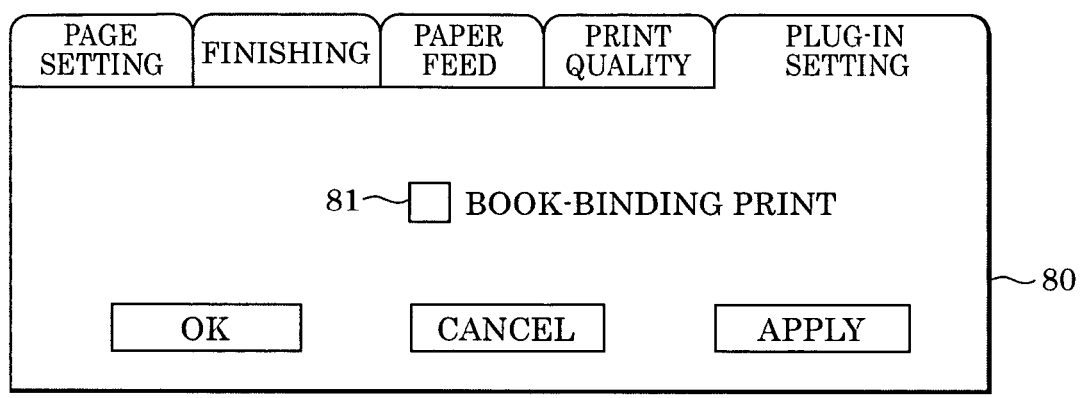
FIGS. 8A and 8B illustrate a setting sheet showing addition of a function, i.e., a book-binding print function of a plug-in module in accordance with an embodiment of the present invention.
Figure 8B:
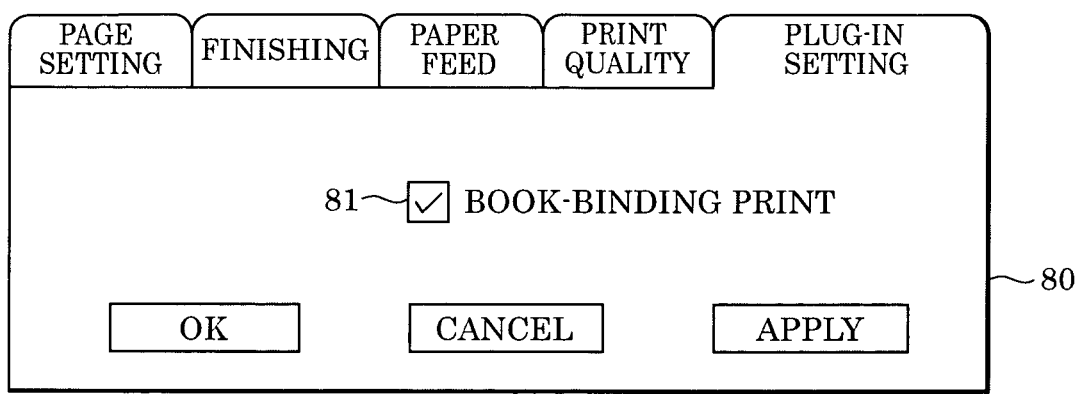

Next, the printer driver 204 inquires the information on the plug-in individual setting sheet in order to display the setting sheet which is a plug-in module 309 individual setting sheet as shown in FIGS. 8A and 8B (step S518). The plug-in module 309 creates an individual setting sheet (step S519), and returns the created individual setting-sheet information to the printer driver 204 (step S520). Thus the printer driver 204 obtains the individual setting-sheet information of the plug-in module 309 (step S521). Next, in the printer driver 204, the inference engine 302 performs the conflict check and updates the state variable list 304, and the conflict manager 303 performs the conflict processing such as the update of the internal structure 305. If there are inconsistencies among the settings, a correction is made (step S522) by updating the state variable list 304 and the internal structure 305. Next, in addition to the setting sheet of the printer driver 204, the setting sheet of the plug-in module 309 obtained in the above-described step S521 is added, and the UI as shown in FIG. 8A is displayed (step S522).

FIG. 8A is a diagram illustrating an example of a print setting sheet, which is a UI provided to the user by the printer driver 204 after the plug-in is added. As shown in FIG. 8A, a setting sheet 80 (tabbed sheet) of the plug-in module 309, which is "Plug-in setting", is added to the original setting sheets (Page setting, finishing, Paper feed, and Paper quality) of the printer driver 204. Also, the setting sheet 80 has a check box 81 for setting on/off of the book-binding print function by the user. In this regard, in the setting sheet 80 in FIG. 8A, the check box 81 is not checked, and thus the book-binding print function is in an off state (a state in which the state variables are initial values).

Figure 7:
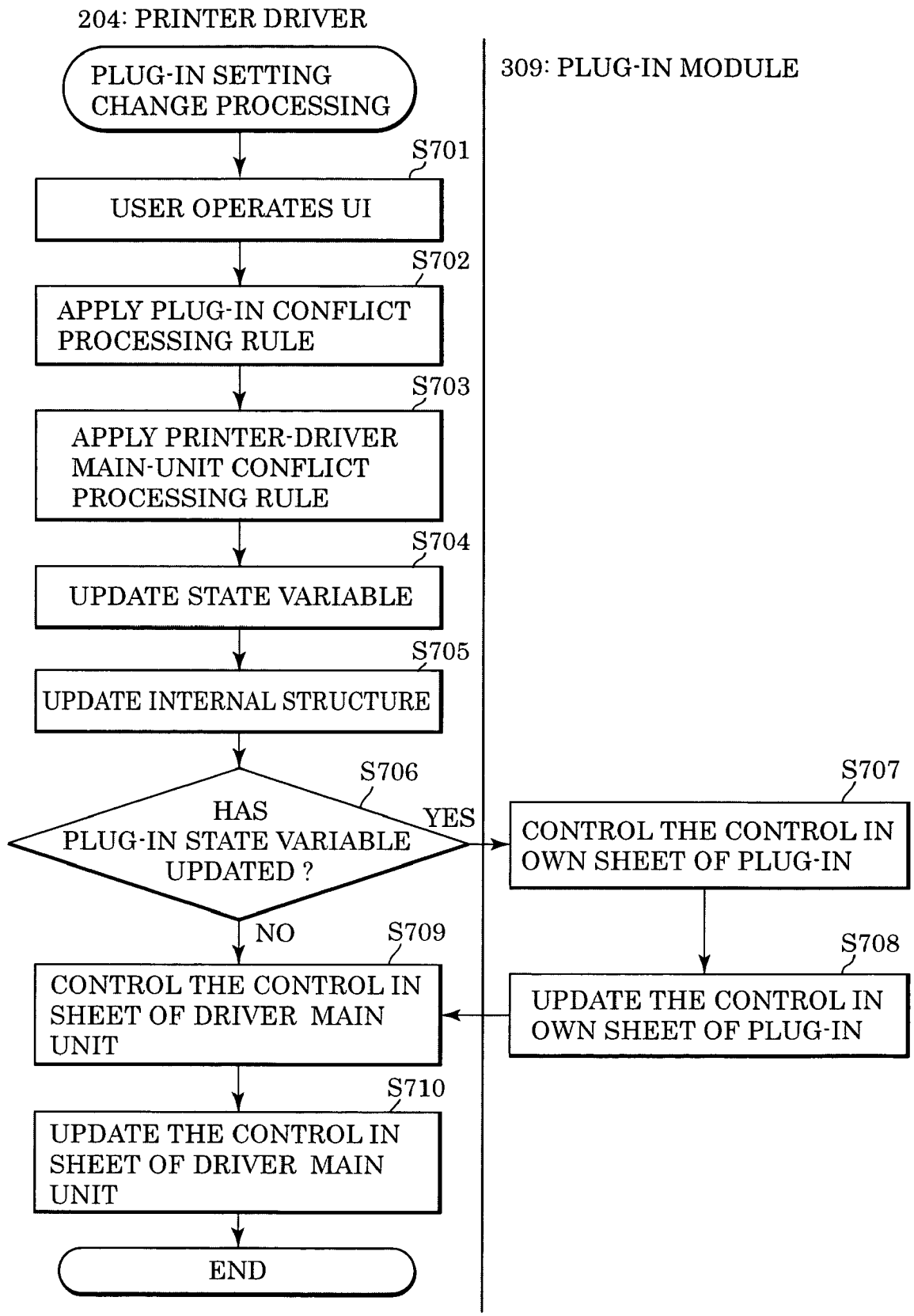
FIG. 7 is a flowchart illustrating conflict processing when the bookbinding print function is selected.

Here, the user checks the box 81 of FIG. 8A to select the bookbinding function as shown in FIG. 8B. FIG. 8B shows a checked box 81 to indicate that bookbinding print function is selected. Next, conflict processing when the bookbinding print function is selected is described. FIG. 7 is a flowchart illustrating conflict processing when the bookbinding print function is selected.

First, in step S701, the update of the internal structure 305 and the state variable list 304 is performed in accordance with the user's check operation of the check box 81 from the state in FIG. 8A to the state in FIG. 8B. Next, upon receiving the UI operation in step S701, the conflict processing rule 308 of the plug-in module 309 read in step S513 in FIG. 5 is applied (step S702). Subsequently, the processing to apply the conflict processing rule 301 held by the printer driver 204 main unit is performed (step S703). The state variables of the state variable list 304 are updated corresponding to the conflict processing (step S704).

In this regard, in the present embodiment, the application of the processing rules of steps S702 to S703 are performed in accordance with the order of the rules read in step S513. Also, the priorities of the processing rules are determined in accordance with the order of the application of the plurality of processing rules. In the present embodiment, the conflict processing rule 308 has a higher priority than the conflict processing rule 301. In this regard, if the conflict processing rule 301 needs to have a higher priority, the processing to apply the conflict processing rule 301 is performed in advance.

Here, a description will be given of steps S701 to S704 by showing specific examples. For example, suppose that the internal structure 305 contains cCollate, cGroup, cStaple, and cBooklet as members corresponding to printer functions. Also, the values of the individual members before the application of the conflict processing rules just before step S701 are as follows.
cCollate=0
cGroup=1
cStaple=0
cBooklet=0

Figure 9A:
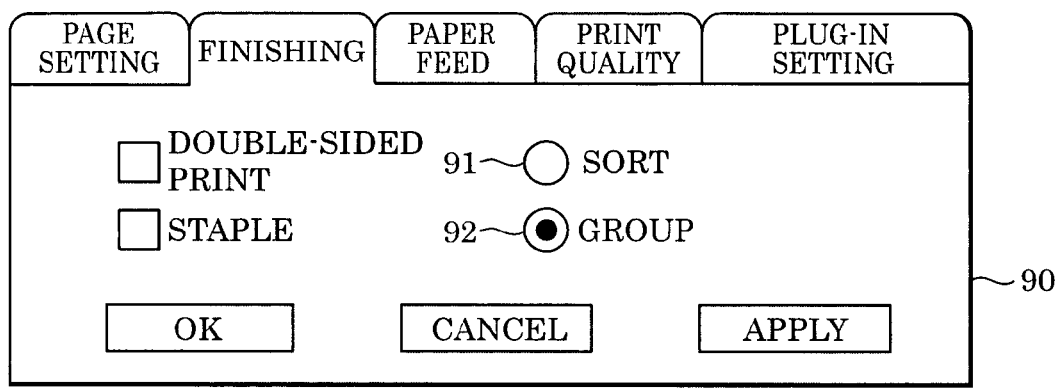
FIGS. 9A and 9B are diagrams illustrating examples of a finishing-touch setting sheet, which is a UI of the printer driver 204.

In the state variable list 304, the state variables cCollate, cGroup, cStaple, and cBooklet, which correspond to individual members, and the state values become as follows:
Collate=OFF
Group=ON
Staple=OFF
Booklet=OFF At this time, as shown in FIG. 9A, a group function radio button 92 of the finishing-touch setting sheet 90, which is a UI provided by the printer driver 204, is selected while the sort function radio button 91 is not selected. In this regard, since the user's operation, which changes to FIG. 8B, is not yet performed (before step S701), Booklet remains OFF.

The printer driver 204 then receives a request to change the setting of the bookbinding print function to ON from the application 201 in response to step S701. By this, the member cBooklet of the internal structure 305 is updated from 0 to 1 as shown below.
cCollate=0
cGroup=1
cStaple=0
cBooklet=1

Next, the driver management part 306 calls the conflict manager 303, and updates the Booklet state variable in the state variable list from off to ON. By this, the state variable list 304 becomes as follows.
Collate=OFF
Group=ON
Staple=OFF
Booklet=ON Subsequently, in step S702, the inference engine 302 is called, and the application of the conflict processing rule begins. Reference will now be made back to the exemplary rules (1), (2), (3) and (4), previously defined. In summary, by application of these rules, when Booklet is turned ON, group is OFF, which means that collate is ON. Specifically, first, each of the printer functional names in the inference engine 302 is initialized by the value held by each of the state variables of the state variable list 304. Subsequently, the example (1) of the rules of the conflict processing rule 308 read in step S513 before is applied, and the state value of the state variable Group is changed from ON to OFF. In this regard, the example (1) of the rules is a rule defined by Group (OFF)<–Booklet (ON) as described above.

By this, the state values of the state variable list 304 are updated as follows.
Collate=OFF
Group=OFF
Staple=OFF
Booklet=ON Next, in step S703, the example (4) of the rules of the conflict processing rule 301 is applied, and the state value of the state variable Collate is changed from OFF to ON. In this regard, the example (4) of the rules is a rule defined by Collate (ON)<–Group (OFF) as described above. Since there is no other rules to be applied in the conflict processing rule 301, the application of the conflict processing rule in the inference engine 302 is completed.

By this, the state values of the state variable list 304 are updated as follows (step S704).
Collate=ON
Group=OFF
Staple=OFF
Booklet=ON As shown above, by the processing in steps S701 to S703, the conflict processing is performed based on changes in the setting sheets UI.

Returning to the flowchart in FIG. 7, in step S704, the state variable list 304 is updated in accordance with the conflict processing rules 301 and 308, and then the conflict manager 303 updates the internal structure 305 in accordance with the updated state variable list 304 (step S705). Specifically, the values of the members become as follows.
cCollate=1
cGroup=0
cStaple=0
cBooklet=1

Next, the printer driver 204 determines whether a state variable of the plug-in module 309 has been updated in step S704 (step S706). Here, if the state variable is determined to have been updated (YES in step S706), the printer driver 204 calls the plug-in module 309, controls the control of the plug-in module 309 individual setting sheet in accordance with the change of the state variables (step S707). When the printer driver 204 updates the control in the plug-in module 309 individual setting sheet (step S708), the processing is returned to the printer driver 204. By this, the printer driver 204 performs the processing in step 709 shown below.

Also, when the state variables of the plug-in module 309 are not updated in step S706 (NO in step S706), in step 709, the printer driver 204 controls the control of the setting sheets in the printer driver 204 main unit in accordance with the state variables updated in step S704. Next, in step S710, the printer driver 204 updates the control which performs control in the setting sheets in the printer driver 204 main unit, and completes the conflict processing and the UI processing.

Figure 9B:
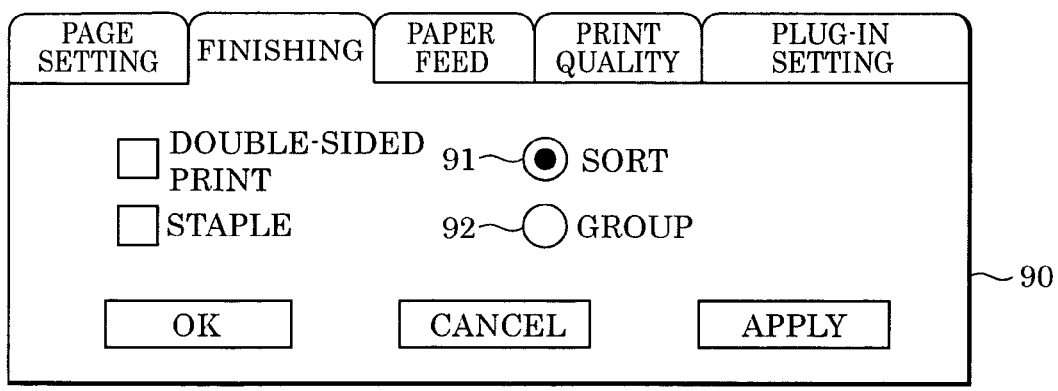

In this manner, by the example of the conflict processing in accordance with the change is setting of steps S701 to S710, the finishing setting sheet 90 is changed as shown from FIG. 9A before conflict processing, to FIG. 9B after the conflict processing rules are applied. That is, a radio button 92 of the Group (the member name in the internal structure is "Group") function is originally selected in the "finishing" setting sheet 90, and then by the application of the conflict processing rule, a radio button 91 of the sort (the member name in the internal structure 305 is "Collate") function is selected to be changed to an on state.

The processing as described above is executed repeatedly until end processing provided in the printer driver management part 306 is called by the application 201. When the end processing of the printer driver 204 is called by the application 201, the information of the conflict processing rules 301 and 308, etc., generated in the free memory 202 is deleted, and the other end processing is performed. By this, all the processing is completed, the processing of the printer driver 204 in the present embodiment is completed, and the deletion from the RAM 2 is performed by the function of the OS 205.

As described above, in the host computer 3000 according to the present embodiment, even if the plug-in module 309 is incorporated in the printer driver 204, by referring to the conflict processing rule 308 of the plug-in module 309, it is possible to prevent inconsistencies from occurring among the settings in the printer driver 204 after the plug-in is added. That is, in the host computer 3000 according to the present embodiment, it is possible to perform accurate conflict processing even in the environment in which a new function is added to the printer in a plug-in form.

In this regard, in the present embodiment, an external memory is used for the medium for storing the printer driver 204. However, a FD (flexible disk), a HD drive, a CD-ROM, an IC memory card, etc., can be used for the external memory 11. Furthermore, this printer driver 204 by itself or together with the OS 205 and the other programs running on the host computer 3000 may be recorded in the ROM 3, then may be configured as part of the memory map, and may be directly executed by the CPU 1.

Also, in the above-described embodiment, various functions are achieved by reading the programs for achieving the functions in the host computer 3000 into the memory (RAM) and the CPU executing these functions. However, the invention is not limited to this, and all of the processing or part of the functions may be achieved by dedicated hardware. Also, the above-described memory may be constituted by a non-volatile memory such as a magnetic optical disk unit, a flash memory, etc., a read-only recording medium such as a CD-ROM, etc., a volatile memory other than a RAM, or a computer-readable and writable recording medium by the combination of these.

Also, a program for achieving various processing functions in the host computer 3000 may be recorded into a computer-readable recording medium, and the program recorded in the recording medium may be read into a computer system, and each processing may be performed by executing the program. In this regard, a "computer system" mentioned here includes an OS, hardware such as a peripheral device, etc.

Also, a "computer-readable recording medium" means a portable medium such as a flexible disk, a magnetic optical disk, a ROM, a CD-ROM, etc., and a storage device such as a hard disk contained in a computer system. Furthermore, a "computer-readable recording medium" includes a device for holding a program for a certain period of time such as an internal volatile memory (RAM) of a computer system to be a server or a client when the program is transmitted through a network such as the Internet, etc., and a communication line such as a telephone line, etc.

Also, the above-described program may be transmitted from a computer system storing the program in a storage device, etc., through a transmission medium, or may be transmitted to another computer system by a transmitted wave in the transmission medium. Here, a "transmission medium" for transmitting the program means a medium having an information transmission function such as a network (communication network), for example, the Internet, etc., and the communication line such as a telephone line, etc. Also, the above-described program may achieve part of the above-described functions. Furthermore, the program may achieve the above-described functions by combining with the program that is already recorded in a computer system, that is, the program may be a differential file (differential program).

Also, a program product such as a computer-readable recording medium which records the above-described program may be applied to an embodiment of the present invention. The above-described program, recording medium, a transmission medium, and the program product are included in the scope of the present invention. As described above, a detailed description has been given of the embodiments of the present invention with reference to the drawings. However, a specific structure is not limited to the embodiments, and a design, etc., are included within the spirit and scope of the present invention.

While the present invention has been described with reference to what are presently considered to be the embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

In a second embodiment, a description will be given of a system in which a tint-block print function is expanded in a plug-in form. The conflict processing rule 308 of the plug-in according to the second embodiment contains, for example, the definition of a rule example (1) as shown below.

$$\text{RESOLUTION (600)} \leftarrow \text{SECUREMARK (ON)} \quad (1)$$

where RESOLUTION indicates the resolution setting, and SECUREMARK indicates a tint-block print function. The rule (1) is the conflict processing rule showing that when the tint-block print function is valid, the resolution setting is limited to 600 dpi.

Next, a description will be given of the processing on the UI of the printer driver 204 in the host computer 3000 according to the present embodiment. When the initialization processing included in the printer driver 204 is called by the application 201 running under the control of the OS 205, the printer driver 204 is loaded into the RAM 2 under the control of the OS 205. When the printer driver 204 is loaded into the RAM 2, the initialization processing part of the printer driver 204 included in the driver management part 306 is called, and the initialization processing is performed.

FIG. 5 is a diagram illustrating a flow of the initialization processing when the application 201 shown in FIG. 3 opens a UI of the printer driver 204. In this regard, the plug-in module 309 shown in FIG. 5 is incorporated in the printer driver 204 by the plug-in as shown in FIG. 3.

First, the application 201 inquires of the printer driver 204 about the size of the memory area for storing the internal structure of the printer driver 204 (step S501). Thus the printer driver 204 inquires of the plug-in module 309 about the size of the data area of the internal structure necessary for the plug-in module 309 (step S502). The plug-in module 309 calculates (step S503) the size of the area (the size of an individual data area) of the necessary internal structure, and returns the size of the calculated individual data area to the printer driver 204 (step S504). After obtaining the size of the individual data area from the plug-in module 309 (step S505), the printer driver 204 returns to the application 201 the sum of the size of the data area in the internal structure 305 necessary for the printer driver 204 and the size of the individual data of the plug-in module 309 obtained in the above-described step S505 (step S506).

The application 201 receives the value returned from the printer driver 204 (step S507), and acquires a memory area for the obtained size in the free memory 202 (step S508). The application 201 passes the memory area acquired in the above-described step S508, and instructs the printer driver 204 to open the UI of the printer driver 204 (step S509). The internal structure 305 at this time has, for example, a memory map as shown in FIG. 6. FIG. 6 is a diagram illustrating the example of a memory map of the internal structure 305 necessary for the printer driver 204. As shown in FIG. 6, the internal structure 305 includes a public area 601, a driver private area 602 corresponding to the size of the data area necessary for the printer driver 204, and a plug-in private area 603 corresponding to the size of the individual data area of the plug-in module 309. Next, the interface of the printer driver 204 is called based on the instruction in step S509 (step S510).

The printer driver 204 inquires of the plug-in module 309 about the storage location of the conflict processing rule 308 supplied with the plug-in module 309 (step S511). Thus the plug-in module-309 returns to the printer driver 204 the storage location of the file in which the conflict processing rule 308 related to the setting values of the plug-in module 309 are described (step S512).

The inference engine 302 reads the conflict processing rule 308 supplied with the plug-in module 309 into the RAM 2 through the conflict manager 303, and then reads the conflict processing rule 301 (step S513).

As described in FIG. 4, for all the printer functional names defined in the conflict processing rules 301 and 308, the state variables and the values thereof corresponding to individual printer functional names are held as the state variable list 304. As shown in FIG. 4, the values of the state variables in the state variable list 304 are linked with the corresponding members in the internal structure 305 used in the printer driver 204. The initial values of all the state variables in the state variable list 304 are set to the values of the members of the internal structure 305.

In step S514, the initialization processing of the state variables is performed through the conflict manager 303. In the initialization processing, the state variable list 304 of the printer driver 204 is generated by referring to the internal structure 305, and then an instruction of the initialization of the state variables originally held by the plug-in module 309 is given to the plug-in module 309 (step S515). Thus the plug-in module 309 returns the initialized state variables (in this embodiment) to the printer driver 204 (step S516). The printer driver 204 receives the state variables of the plug-in module 309, and adds the variables to the state variable list 304 through the conflict manager 303 (step S517).

Figure 11A:
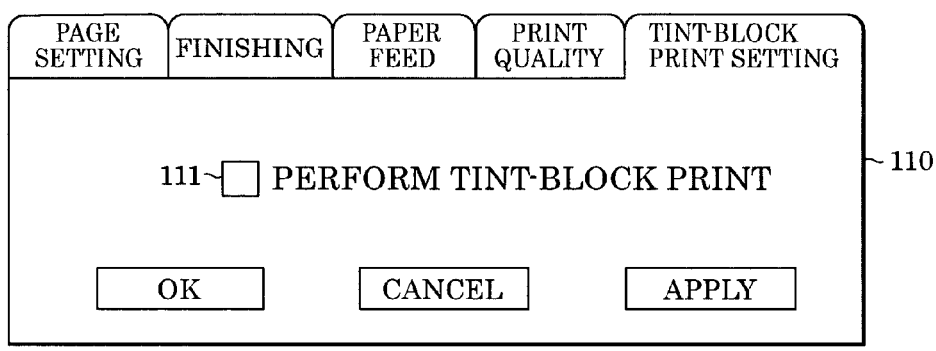
FIG. 11A is an example of a dialog illustrating an example of an expansion system of the printer driver 204.
Figure 11B:
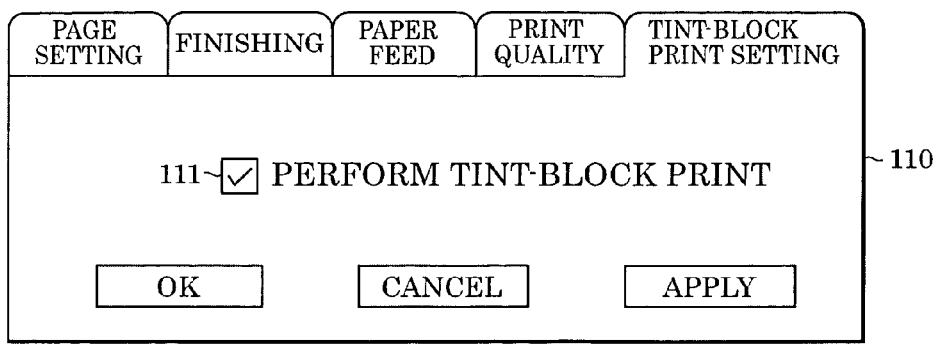
FIG. 11B is an example of a dialog illustrating an example of an expansion system of the printer driver 204.

Next, the printer driver 204 inquires the information on the plug-in individual setting sheet in order to display the setting sheet which is a plug-in module 309 individual setting sheet as shown in FIGS. 11A and 11B (step S518). The plug-in module 309 creates an individual setting sheet (step S519), and returns the created individual setting-sheet information to the printer driver 204 (step S520). Thus the printer driver 204 obtains the individual setting-sheet information of the plug-in module 309 (step S521). Next, in the printer driver 204, the inference engine 302 performs the conflict check and updates the state variable list 304, and the conflict manager 303 performs the conflict processing such as the update of the internal structure 305. If there are inconsistencies among the settings, a correction is made (step S522). Next, in addition to the setting sheet of the printer driver 204, the setting sheet of the plug-in module 309 obtained in the above-described step S521 is added, and the UI as shown in FIG. 11A is displayed (step S522).

FIG. 11A is a diagram illustrating an example of a print setting sheet, which is a UI provided to the user by the printer driver 204 after the plug-in is added. As shown in FIG. 11A, a setting sheet 110 of the plug-in module 309, which is "Tint-block print setting", is added to the original setting sheets (Page setting, finishing, Paper feed, and Paper quality) of the printer driver 204. Also, the setting sheet 110 has a check box 111 for setting on/off of the tint-block print function by the user. In this regard, in the setting sheet 110 in FIG. 11A, the check box 111 is not checked, and thus the tint-block print function is in an off state (a state in which the state variables are initial values).

Here, in the setting sheet 110 in FIG. 11A, the user checks the check box 111 as shown in FIG. 11B, and thus the tint-block print function is turned on. FIG. 11B is a diagram illustrating a state in which the tint-block print function is turned on in the example of the print setting sheet in FIG. 11A. Next, a description will be given of the conflict processing when the tint-block print function, which is a plug-in function, is turned on as shown in FIG. 11B. FIG. 7 is a flowchart illustrating the conflict processing when the tint-block print function as shown in FIG. 11B, which is a plug-in function, is changed to on.

First, in step S701, the update of the internal structure 305 and the state variable list 304 is performed in accordance with the user's check operation of the check box 111 from the state in FIG. 11A to the state in FIG. 11B. Next, upon receiving the UI operation in step S701, the conflict processing rule 308 of the plug-in module 309 read in step S513 in FIG. 5 is applied (step S702). Subsequently, the processing to apply the conflict processing rule 301 held by the printer driver 204 main unit is performed (step S703). The state variables of the state variable list 304 are updated corresponding to the conflict processing (step S704).

In this regard, in the present embodiment, the application of the processing rules of steps S702 to S703 are performed in accordance with the order of the rules read in step S513. Also, the priorities of the processing rules are determined in accordance with the order of the application of the plurality of processing rules. In the present embodiment, the conflict processing rule 308 has a higher priority than the conflict processing rule 301. In this regard, if the conflict processing rule 301 needs to have a higher priority, the processing to apply the conflict processing rule 301 is performed in advance.

Here, a description will be given of steps S701 to S704 by showing specific examples. For example, suppose that the internal structure 305 contains cResolution and cSecureMark as members corresponding to printer functions. Also, the values of the individual members before the application of the conflict processing rules just before step S701 are as follows.
cResolution=300
cSecureMark=0

Figure 12A:
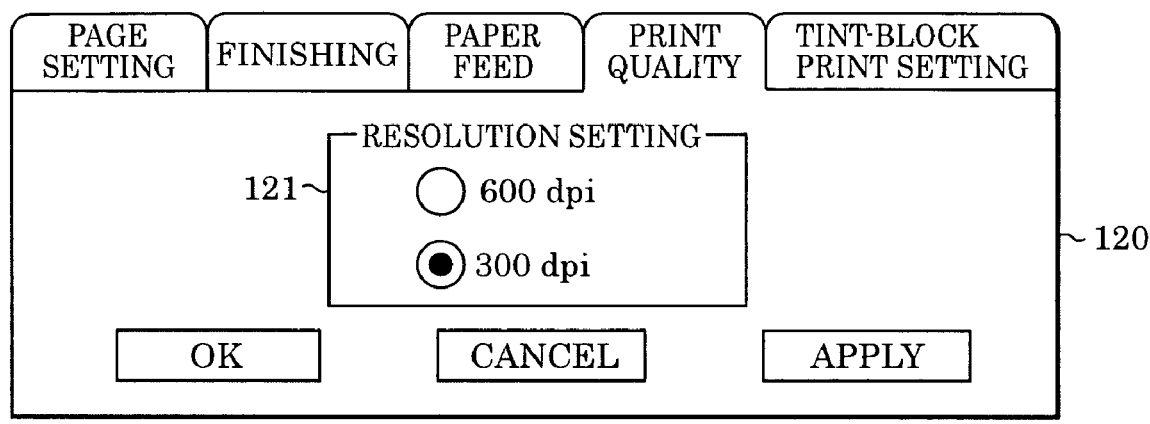
FIG. 12A is an example of a dialog illustrating an example of an expansion system of the printer driver 204.
Figure 12B:
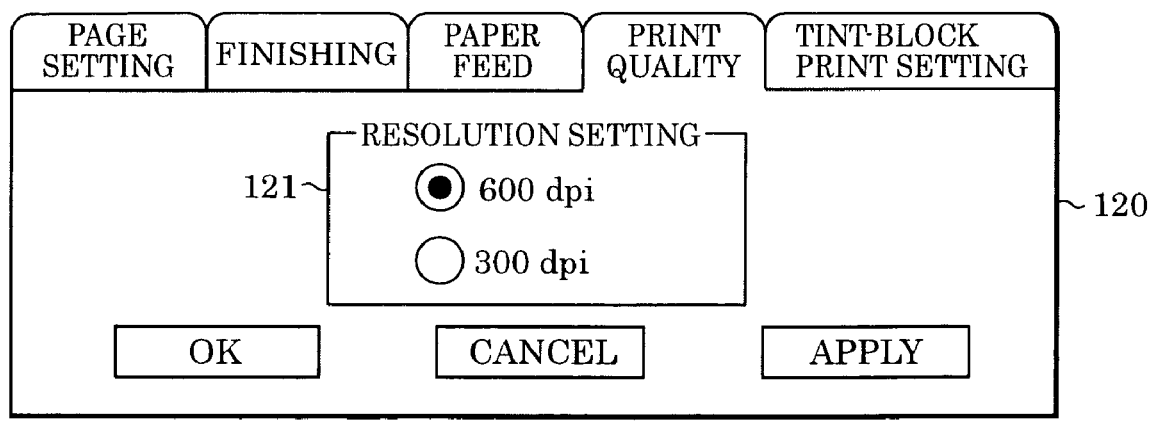
FIG. 12B is an example of a dialog illustrating an example of an expansion system of the printer driver 204.

By this operation, in the state variable list 304, the state variables Resolution and SecureMark, which correspond to individual members, and the state values become as follows.
Resolution=300
SecureMark=OFF At this time, the state of the print-quality setting sheet 120, which is a UI provided by the printer driver 204, is in a state, as shown in FIG. 12A, in which a resolution-setting radio button of 300 dpi is selected. In this regard, since the user's operation, which changes to FIG. 12B, is not yet performed (before step S701), the tint-block print function remains OFF.

In such a state, the printer driver 204 receives a change request for changing the setting of the tint-block print function to on from the user in response to step S701. By this, the member cSecureMark of the internal structure 305 is updated from 0 to 1 as shown below.
cResolution=300
cSecureMark=1

Next, the driver management part 306 calls the conflict manager 303, and updates the Secure state variable in the state variable list from off to on. By this, the state variable list 304 becomes as follows.
Resolution=300
SecureMark=ON Subsequently, in step S702, the inference engine 302 is called, and the application of the conflict processing rule begins. First, each of the printer functional names in the inference engine 302 is initialized by the value held by each of the state variables of the state variable list 304. Subsequently, the example (1) of the rules of the conflict processing rule 308 read in step S513 before is applied, and the state value of the state variable Resolution is changed from 300 to 600. In this regard, the example (1) of the rules is a rule defined by RESOLUTION (600)<–SECUREMARK (ON) as described above.

By this, the state values of the state variable list 304 are updated as follows.
Resolution=600
SecureMark=ON Next, in step S703, since there is no other rules to be applied in the conflict processing rule 301, the application of the conflict processing rule in the inference engine 302 is completed (step S704).

As shown above, by the processing in steps S701 to S703, the conflict processing is performed according to the change of the settings performed on the UI.

Returning to the flowchart in FIG. 7, in step S704, the state variable list 304 is updated in accordance with the conflict processing rules 301 and 308, and then the conflict manager 303 updates the internal structure 305 in accordance with the updated state variable list 304 (step S705). Specifically, the values of the members become as follows.
cResolution=600
cSecureMark=1

Next, the printer driver 204 determines whether or not a state variable of the plug-in module 309 has been updated in step S704 (step S706). Here, if the state variable is determined to have been updated (YES in step S706), the printer driver 204 calls the plug-in module 309, performs controlling the control in the plug-in module 309 individual setting sheet in accordance with the change of the state variables (step S707). When the printer driver 204 updates the control in the plug-in module 309 individual setting sheet (step S708), the processing is returned to the printer driver 204. By this, the printer driver 204 performs the processing in step 709 shown below.

Also, when the state variables of the plug-in module 309 are not updated in step S706 (NO in step S706), in step 709, the printer driver 204 performs controlling the control in the setting sheets in the printer driver 204 main unit in accordance with the state variables updated in step S704. Next, in step S710, the printer driver 204 updates the control which performs control in the setting sheets in the printer driver 204 main unit, and completes the conflict processing and the UI processing.

As described above, by the example of the conflict processing in accordance with the setting change shown in steps S701 to S710, the print-quality setting sheet 120 is changed from the state as shown in FIG. 12A before applying the conflict processing rule to the state shown in FIG. 12B after applying the conflict processing rule. That is to say, 300 dpi is originally selected by a radio button 121 of the resolution (the member name in the internal structure is "Resolution") setting in the "print quality" setting sheet 120, and then by the application of the conflict processing rule, a change is made to a state in which 600 dpi is selected by the radio button 121.

The processing as described above is executed repeatedly until end processing provided in the printer driver management part 306 is called by the application 201. When the end processing of the printer driver 204 is called by the application 201, the information of the conflict processing rules 301 and 308, etc., generated in the free memory 202 is deleted, and the other end processing is performed. By this, all the processing is completed, the processing of the printer driver 204 in the present embodiment is completed, and the deletion from the RAM 2 is performed by the function of the OS 205.

As described above, in the host computer 3000 according to the present embodiment, even if the plug-in module 309 is incorporated in the printer driver 204, by referring to the conflict processing rule 308 of the plug-in module 309, it is possible to prevent inconsistencies from occurring among the settings in the printer driver 204 after the plug-in is added. That is to say, in the host computer 3000 according to the present embodiment, it is possible to perform accurate conflict processing even in the environment in which a new function is added to the printer in a plug-in form.

In this regard, in the present embodiment, an external memory is used for the medium for storing the printer driver 204. However, a FD (flexible disk), a HD drive, a CD-ROM, an IC memory card, etc., can be used for the external memory 11. Furthermore, this printer driver 204 by itself or together with the OS 205 and the other programs running on the host computer 3000 may be recorded in the ROM 3, then may be configured as part of the memory map, and may be directly executed by the CPU 1.

Also, in the above-described embodiment, various functions are achieved by reading the programs for achieving the functions in the host computer 3000 into the memory (RAM) and the CPU executing these functions. However, the invention is not limited to this, and all of the processing or part of the functions may be achieved by dedicated hardware. Also, the above-described memory may be constituted by a non-volatile memory such as a magnetic optical disk unit, a flash memory, etc., a read-only recording medium such as a CD-ROM, etc., a volatile memory other than a RAM, or a computer-readable and writable recording medium by the combination of these.

Also, a program for achieving various processing functions in the host computer 3000 may be recorded into a computer-readable recording medium, and the program recorded in the recording medium may be read into a computer system, and each processing may be performed by executing the program. In this regard, a "computer system" mentioned here includes an OS, hardware such as a peripheral device, etc.

Also, a "computer-readable recording medium" means a portable medium such as a flexible disk, a magnetic optical disk, a ROM, a CD-ROM, etc., and a storage device such as a hard disk contained in a computer system. Furthermore, a "computer-readable recording medium" includes a device for holding a program for a certain period of time such as an internal volatile memory (RAM) of a computer system to be a server or a client when the program is transmitted through a network such as the Internet, etc., and a communication line such as a telephone line, etc.

Also, the above-described program may be transmitted from a computer system storing the program in a storage device, etc., through a transmission medium, or may be transmitted to another computer system by a transmitted wave in the transmission medium. Here, a "transmission medium" for transmitting the program means a medium having an information transmission function such as a network (communication network), for example, the Internet, etc., and the communication line such as a telephone line, etc. Also, the above-described program may achieve part of the above-described functions. Furthermore, the program may achieve the above-described functions by combining with the program that is already recorded in a computer system, that is to say, the program may be a differential file (differential program).

Also, a program product such as a computer-readable recording medium which records the above-described program may be applied to an embodiment of the present invention. The above-described program, recording medium, a transmission medium, and the program product are included in the scope of the present invention. As described above, a detailed description has been given of the embodiments of the present invention with reference to the drawings. However, a specific structure is not limited to the embodiments, and a design, etc., are included within the spirit and scope of the present invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application Nos. 2003-403558 filed Dec. 2, 2003, and 2004-336381 filed Nov. 19, 2004, which are hereby incorporated by reference herein.

What is claimed is:

1. An information processing apparatus, in which a print processing related program has been stored, wherein the print processing related program has an UI driver and a graphics driver, comprising:
    first rule storage means for storing a first conflict processing rule that determines a resolution rule for a conflict of setting values for the print processing related program to which a plug-in module for expanding functions of both the UI driver and the graphics driver is not added;
    controlling means for control additional installation of an installation set including the plug-in module and a second conflict processing rule that determines a resolution rule for a conflict of setting values including a setting value set to the plug-in module for expanding a function of the print processing related program and a setting value for the print processing related program;
    second rule storage means for storing the second conflict processing rule according to the additional installation; and
    setting adjustment means for performing setting adjustment processing such that the setting value set to the print processing related program function and the setting value set to the plug-in module do not conflict with each other based on the first conflict processing rule and the second conflict processing rule,
    wherein the setting adjustment means applies the first conflict processing rule and the second conflict processing rule in the order of descending priorities to perform setting adjustment processing.

2. The information processing apparatus according to claim 1, further comprising checking means for checking whether or not the second conflict processing rule is stored in the second rule storage means when the plug-in module is added.

3. The information processing apparatus according to claim 1, further comprising: display means for displaying information, and screen display means for displaying, on the display means, a setting status screen allowing a user to visually check a setting status of a setting value set to the print processing related program function and the setting value set to the plug-in module,
    wherein the setting status screen displayed on the display means by the screen display means shows the setting status after setting adjustment processing by the setting adjustment means.

4. The information processing apparatus according to claim 3, wherein in the setting status screen displayed on the display means by the screen display means, each setting of the print processing related program function or the plug-in module can be changed by a user's operation, and when the user has changed one or a plurality of setting values of the print processing related program function or the plug-in module, the setting adjustment means performs setting adjustment processing such that setting value of the print processing related program function and the setting value of the plug-in module do not conflict with each other after the change based on the first conflict processing rule and the second conflict processing rule which have been read.

5. The information processing apparatus according to claim 1, wherein the function expanded by using a plug-in module includes at least one of a book-binding print and a tint-blocking print.

6. A method of print control using an information processing system, in which a print processing related program has been stored, wherein the print processing related program has an UI driver and a graphics driver, the method comprising:
   obtaining setting information on the settings of the print processing related program function and a plug-in module for expanding functions of both the UI driver and the graphics driver;
   reading, by a processor, a first conflict processing rule from a first rule storage means for storing the first conflict processing rule that determines a resolution rule for a conflict of setting values for the print processing related program to which the plug-in module is not added;
   controlling additional installation of an installation set including the plug-in module and a second conflict processing rule that determines a resolution rule for a conflict of setting values including a setting value set to the plug-in module for expanding a function of the print processing related program and a setting value for the print processing related program, the second conflict processing rule being stored in a second rule storage means;
   reading, by the processor, the second conflict processing rule from the second storage means; and
   performing setting adjustment processing such that the setting value set to the print processing related program function and the setting value set to the plug-in module do not conflict with each other based on the first conflict processing rule and the second conflict processing rule,
   wherein the steps of reading the first conflict processing rule and the second conflict processing rule, refers to the setting information obtained in the obtaining step, and applies the first conflict processing rule and the second conflict processing rule in the order of descending priorities to perform setting adjustment processing.

7. The method of print control according to claim 6, further comprising a checking step of checking whether the second conflict processing rule is stored in the second rule storage means when the plug-in module is added.

8. The method of print control according to claim 6, when the information processing system has display means, the method further comprising: a screen display step of displaying, on the display means, a setting status screen allowing a user to visually check a setting status of a setting value set to the print processing related program function and the setting value set to the plug-in module,
   wherein the setting status screen displayed on the display means in the screen display step shows the setting status after performing setting adjustment processing.

9. The method of print control according to claim 8, in the setting status screen displayed on the display means in the screen display step, each setting of the print processing related program function and the plug-in module can be changed by a user's operation, and when the user has changed one or a plurality of setting values of the print processing related program function or the plug-in module, the method further comprising the steps of: reading of the first conflict processing rule and the second conflict processing rule from the first rule storage means and second rule storage means, and an after-change adjustment step of performing setting adjustment processing such that inconsistencies do not arise between any of two setting values of the print processing related program function and the plug-in module after the change based on the first conflict processing rule and the second conflict processing rule which have been read.

10. A control program stored on a non-transitory computer-readable medium and for controlling a method of print control using an information processing system, in which a print processing related program has been stored, wherein the print processing related program has an UI driver and a graphics driver, which causes a computer to perform the method of print control, the method comprising:
    obtaining setting information on the settings of the print processing related program function and plug-in module for expanding functions of both the UI driver and the graphics driver;
    reading, by a processor, a first conflict processing rule from a first rule storage means for storing the first conflict processing rule that determines a resolution rule for a conflict of setting values for the print processing related program to which the plug-in module is not added;
    controlling additional installation of an installation set including the plug-in module and a second conflict processing rule that determines a resolution rule for a conflict of setting values including a setting value set to the plug-in module for expanding a function of the print processing related program and a setting value for the print processing related program, the second conflict processing rule being stored in a second rule storage means;
    reading, by the processor, the second conflict processing rule from the second storage means; and
    performing setting adjustment processing such that the setting value set to the print processing related program function and the setting value set to the plug-in module do not conflict with each other based on the first conflict processing rule and the second conflict processing rule,
    wherein the steps of reading the first conflict processing rule and the second conflict processing rule, refers to the setting information obtained in the obtaining step, and applies the first conflict processing rule and the second conflict processing rule in the order of descending priorities to perform setting adjustment processing.

11. A method of printing by adding a plug-in module to a function of a print driver, which has a UI driver and a graphics driver, used for printing within a computer system, wherein the added plug-in module expands a function of the UI driver and the graphics driver, the method comprising:
    obtaining settings of the print driver and the plug-in module for expanding a function of a print processing related program;
    providing a first conflict processing rule that determines a resolution rule for a conflict of setting values for the print processing related program to which the plug-in module is not added;
    providing an installation set including the plug-in module and a second conflict processing rule that determines a resolution rule for a conflict of setting values including a setting value set to the plug-in module for expanding a function of the print processing related program and a setting value for the print processing related program; and
    determining, by a processor, whether the setting values of the print driver and the plug-in module conflict based on the first conflict processing rule and the second conflict processing rule; and
    if so, adjusting settings of the print driver and the plug-in module by applying the first conflict processing rule and the second conflict processing rule so that said adjusted setting values do no conflict with each other,
wherein the step of adjusting settings further comprises applying the first conflict processing rule and the second conflict processing rule in order of descending priorities.

12. A program stored on a non-transitory computer-readable medium and for executing the method according to claim 11.

* * * * *